(12) United States Patent
Hirokawa

(10) Patent No.: US 10,868,934 B2
(45) Date of Patent: Dec. 15, 2020

(54) INFORMATION PROCESSING SYSTEM, SERVER APPARATUS, AND NON-TRANSITORY COMPUTER READABLE RECORDING MEDIUM

(71) Applicant: KYOCERA DOCUMENT SOLUTIONS INC., Osaka (JP)

(72) Inventor: Osamu Hirokawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/715,380

(22) Filed: Dec. 16, 2019

(65) Prior Publication Data
US 2020/0195808 A1  Jun. 18, 2020

(30) Foreign Application Priority Data
Dec. 17, 2018 (JP) ................................ 2018-235104

(51) Int. Cl.
*H04N 1/00* (2006.01)
*G06F 3/12* (2006.01)

(52) U.S. Cl.
CPC ....... *H04N 1/00923* (2013.01); *G06F 3/1203* (2013.01); *G06F 3/129* (2013.01); *G06F 3/1257* (2013.01); *G06F 3/1258* (2013.01); *G06F 3/1292* (2013.01); *H04N 1/00307* (2013.01); *H04N 1/00925* (2013.01); *H04N 1/00936* (2013.01); *H04N 1/00952* (2013.01); *G06F 3/1231* (2013.01)

(58) Field of Classification Search
None
See application file for complete search history.

(56) References Cited

U.S. PATENT DOCUMENTS

| | | | |
|---|---|---|---|
| 8,531,688 B2 * | 9/2013 | Okada | H04N 1/00411 358/1.13 |
| 10,613,801 B1 * | 4/2020 | Matysiak | G06F 3/1204 |

(Continued)

FOREIGN PATENT DOCUMENTS

| | | |
|---|---|---|
| JP | 2017228215 A | 12/2017 |
| JP | 2018032286 A | 3/2018 |

*Primary Examiner* — Miya J Williams
(74) *Attorney, Agent, or Firm* — Li & Cai Intellectual Property (USA) Office

(57) ABSTRACT

A server apparatus is configured to receive, from the one client apparatus, a user identifier and a client identifier, determine whether or not the one client apparatus is a high-probability client apparatus, if it is determined that the one client apparatus is not the high-probability client apparatus, determine a high-probability function, determine whether or not differential operation information is present, the differential operation information being information indicating an operation different from an operation to be input in an operation device of the high-probability client apparatus when the high-probability client apparatus executes the high-probability function, out of an operation to be input in an operation device of the one client apparatus when the one client apparatus executes the high-probability function, and if it is determined that the differential operation information is present, send the differential operation information to the one client apparatus.

10 Claims, 8 Drawing Sheets

(56) References Cited

U.S. PATENT DOCUMENTS

| | | | | |
|---|---|---|---|---|
| 2009/0128844 | A1* | 5/2009 | Kondo | H04N 1/00514 358/1.15 |
| 2011/0299120 | A1* | 12/2011 | Sekine | G06F 3/1221 358/1.15 |
| 2012/0262749 | A1* | 10/2012 | Yamamoto | H04N 1/00424 358/1.14 |
| 2013/0201509 | A1* | 8/2013 | Miyazawa | H04N 1/00244 358/1.13 |
| 2018/0275934 | A1* | 9/2018 | Takenaka | G06F 3/1258 |
| 2019/0095157 | A1* | 3/2019 | Kamada | G06F 3/1212 |

\* cited by examiner

INFORMATION PROCESSING SYSTEM, SERVER APPARATUS, AND NON-TRANSITORY COMPUTER READABLE RECORDING MEDIUM

CROSS-REFERENCE TO RELATED PATENT APPLICATION

This application claims the benefit of Japanese Priority Patent Application JP 2018-235104 filed Dec. 17 2018, the entire contents of which are incorporated herein by reference.

FIELD OF THE DISCLOSURE

The present disclosure relates to an information processing system including a plurality of client apparatuses operated by users and a server apparatus communicatively connected to the plurality of client apparatuses. The present disclosure further relates to the server apparatus, and a non-transitory computer readable recording medium that records an information processing program executable by the server apparatus.

BACKGROUND OF THE DISCLOSURE

Where models or the like of a plurality of client apparatuses are different from each other, in some cases, operations to be input in an operation device by a user in order to execute the same function may be different from each other depending on the plurality of client apparatuses.

SUMMARY OF THE DISCLOSURE

User-friendliness is desirable where operations to be input in an operation device by a user in order to execute the same function are different from each other depending on the plurality of client apparatuses.

According to an embodiment of the present disclosure, there is provided an information processing system, including:

a plurality of client apparatuses, each of the plurality of client apparatuses including an operation device;

a mobile device communicatively connected to at least one of the plurality of client apparatuses; and a server apparatus communicatively connected to the plurality of client apparatuses, the one client apparatus being configured to receive, from the mobile device within a certain distance from the client apparatus, a user identifier identifying a user who logs in to the mobile device, and send, to the server apparatus, the received user identifier and a client identifier identifying the client apparatus, the server apparatus being configured to receive, from the one client apparatus, the user identifier and the client identifier, determine whether or not the one client apparatus is a high-probability client apparatus, the high-probability client apparatus being a client apparatus whose probability of being used by a user identified by the received user identifier is high, if it is determined that the one client apparatus is not the high-probability client apparatus, determine a high-probability function, the high-probability function being a function whose probability of being used by the user in the high-probability client apparatus is high, determine whether or not differential operation information is present, the differential operation information being information indicating an operation different from an operation to be input in an operation device of the high-probability client apparatus when the high-probability client apparatus executes the high-probability function, out of an operation to be input in an operation device of the one client apparatus when the one client apparatus executes the high-probability function, and if it is determined that the differential operation information is present, send the differential operation information to the one client apparatus, the one client apparatus being configured to receive, from the server apparatus, the differential operation information, and present the received differential operation information.

According to an embodiment of the present disclosure, there is provided a server apparatus communicatively connected to a plurality of client apparatuses, the plurality of client apparatuses being communicatively connected to a mobile device, each of the plurality of client apparatuses including an operation device, the server apparatus being configured to receive, from the one client apparatus, a user identifier and a client identifier, the user identifier identifying a user who logs in to the mobile device and being received from the mobile device within a certain distance from the client apparatus, the client identifier identifying the client apparatus, determine whether or not the one client apparatus is a high-probability client apparatus, the high-probability client apparatus being a client apparatus whose probability of being used by a user identified by the received user identifier is high, if it is determined that the one client apparatus is not the high-probability client apparatus, determine a high-probability function, the high-probability function being a function whose probability of being used by the user in the high-probability client apparatus is high, determine whether or not differential operation information is present, the differential operation information being information indicating an operation different from an operation to be input in an operation device of the high-probability client apparatus when the high-probability client apparatus executes the high-probability function, out of an operation to be input in an operation device of the one client apparatus when the one client apparatus executes the high-probability function, and if it is determined that the differential operation information is present, send the differential operation information to the one client apparatus.

According to an embodiment of the present disclosure, there is provided a non-transitory computer readable recording medium that records an information processing program executable by a controller circuit of a server apparatus communicatively connected to a plurality of client apparatuses, the plurality of client apparatuses being communicatively connected to a mobile device, each of the plurality of client apparatuses including an operation device, the information processing program causing the controller circuit of the server apparatus to receive, from the one client apparatus, a user identifier and a client identifier, the user identifier identifying a user who logs in to the mobile device and being received from the mobile device within a certain distance from the client apparatus, the client identifier identifying the client apparatus, determine whether or not the one client apparatus is a high-probability client apparatus, the high-probability client apparatus being a client apparatus whose probability of being used by a user identified by the received user identifier is high, if it is determined that the one client apparatus is not the high-probability client apparatus, determine a high-probability function, the high-probability function being a function whose probability of being used by the user in the high-probability client apparatus is high, determine whether or not differential operation information is present, the differential operation information being information indicating an operation different from an operation to be input in an operation device of the high-probability client apparatus when the high-probability client apparatus executes the high-probability function, out of an operation to be input in an operation device of the one client apparatus when the one client apparatus executes the high-probability function, and if it is determined that the differential operation information is present, send the differential operation information to the one client apparatus.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Information Processing System

Figure 1:
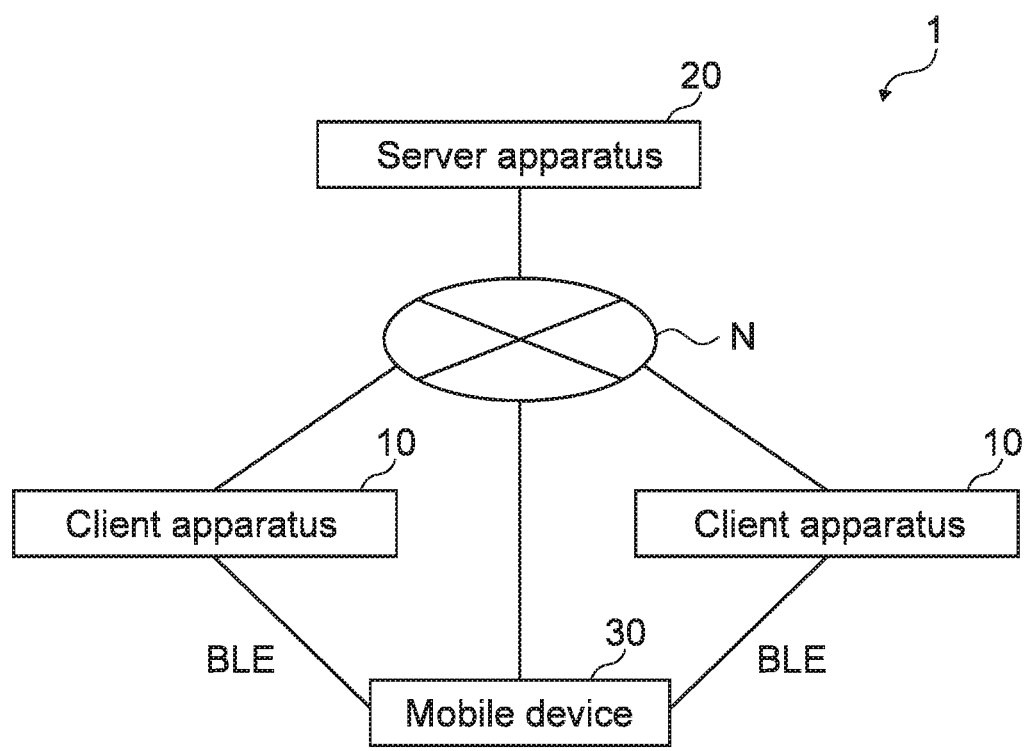
FIG. 1 schematically shows an information processing system of an embodiment of the present disclosure.

FIG. 1 schematically shows an information processing system of an embodiment of the present disclosure.

The information processing system 1 includes the plurality of client apparatuses 10, the server apparatus 20, and the mobile device 30. The plurality of client apparatuses 10, the server apparatus 20, and the mobile device 30 are connected to the network N such as the Internet or a LAN (Local Area Network).

Each of the plurality of client apparatuses 10 is, for example, an image forming apparatus (Multifunction Peripheral, MFP). Typically, models or the like of the plurality of client apparatuses 10 are different from each other. So operations to be input by a user in order to execute the same function (copy function, facsimile function, etc.) may be different from each other depending on the plurality of client apparatuses 10. Each of the plurality of client apparatuses 10 outputs a BLE (Bluetooth (registered trademark) Low Energy) signals periodically (for example, every several seconds). Hereinafter, unless otherwise indicated, one client apparatus 10 will be described.

The server apparatus 20 is communicatively connected to the plurality of client apparatuses 10 via the network N.

A user (for example, office worker), who uses the plurality of client apparatuses 10, carries the mobile device 30. The mobile device 30 receives a BLE signal from any one client apparatus 10 located in a signal receivable area. The mobile device 30 is, for example, a smartphone, a tablet computer, a wearable computer, a laptop computer, or the like.

2. Hardware Configuration of Client Apparatus

Figure 2:
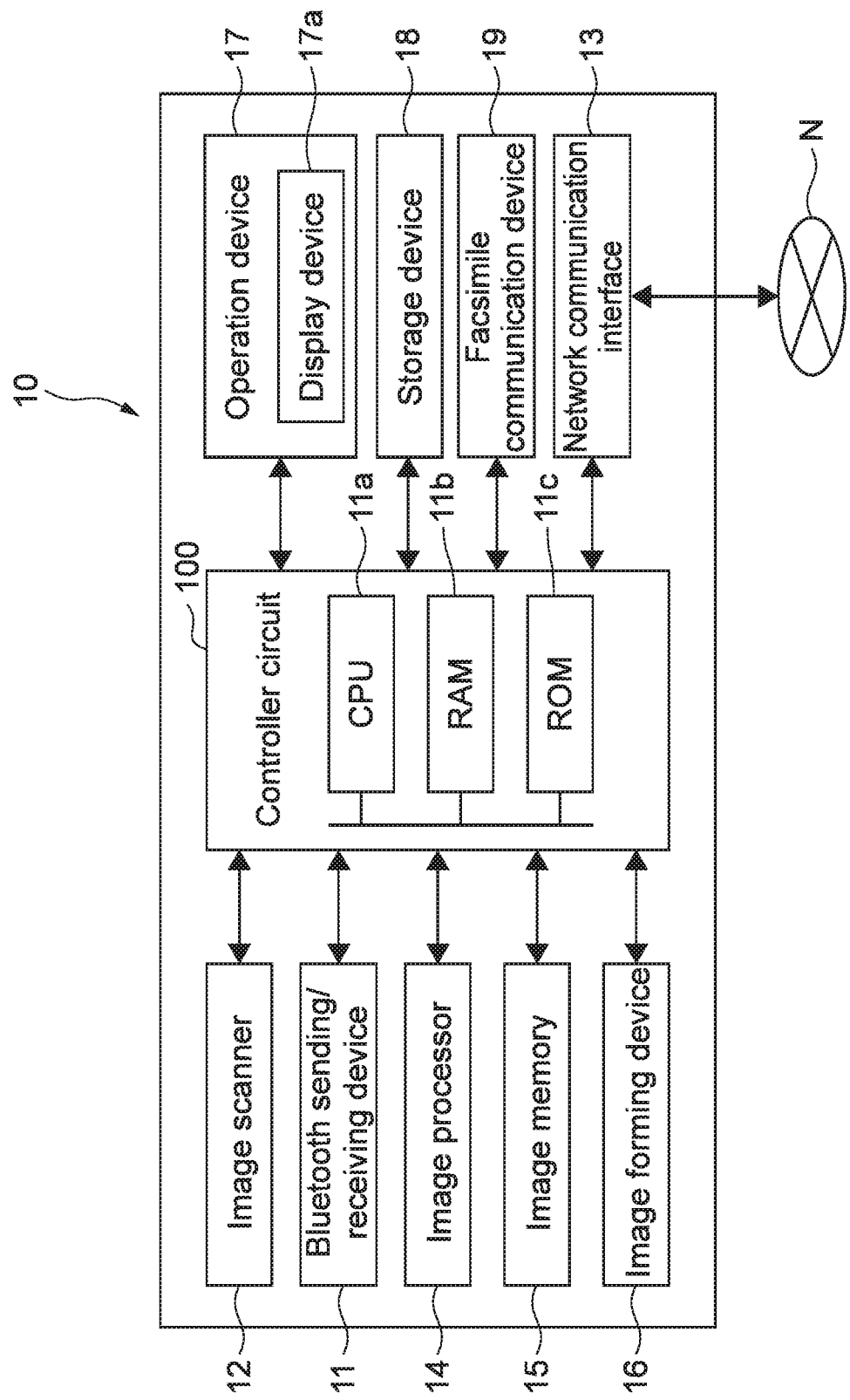
FIG. 2 shows a hardware configuration of a client apparatus.

FIG. 2 shows a hardware configuration of a client apparatus.

The client apparatus 10 (image forming apparatus) includes the controller circuit 100. The controller circuit 100 includes the CPU (Central Processing Unit) 11a, the RAM (Random Access Memory) 11b, the ROM (Read Only Memory) 11c, dedicated hardware circuits, and the like and performs overall operational control of the client apparatus 10. The CPU 11a loads information processing programs stored in the ROM 11c in the RAM 11b and executes the information processing programs. The ROM 11c is a non-volatile memory that stores programs executed by the CPU 11a, data, and the like. The ROM 11c is an example of a non-transitory computer readable recording medium.

The controller circuit 100 is connected to the Bluetooth (registered trademark) sending/receiving device 11, the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 (touch panel) is one mode of an input device. A sound input device including a microphone may be provided as an input device.

The Bluetooth (registered trademark) sending/receiving device 11 periodically (for example, every several seconds) outputs a BLE (Bluetooth (registered trademark) Low Energy) signal.

3. Hardware Configuration of Server Apparatus

Figure 3:
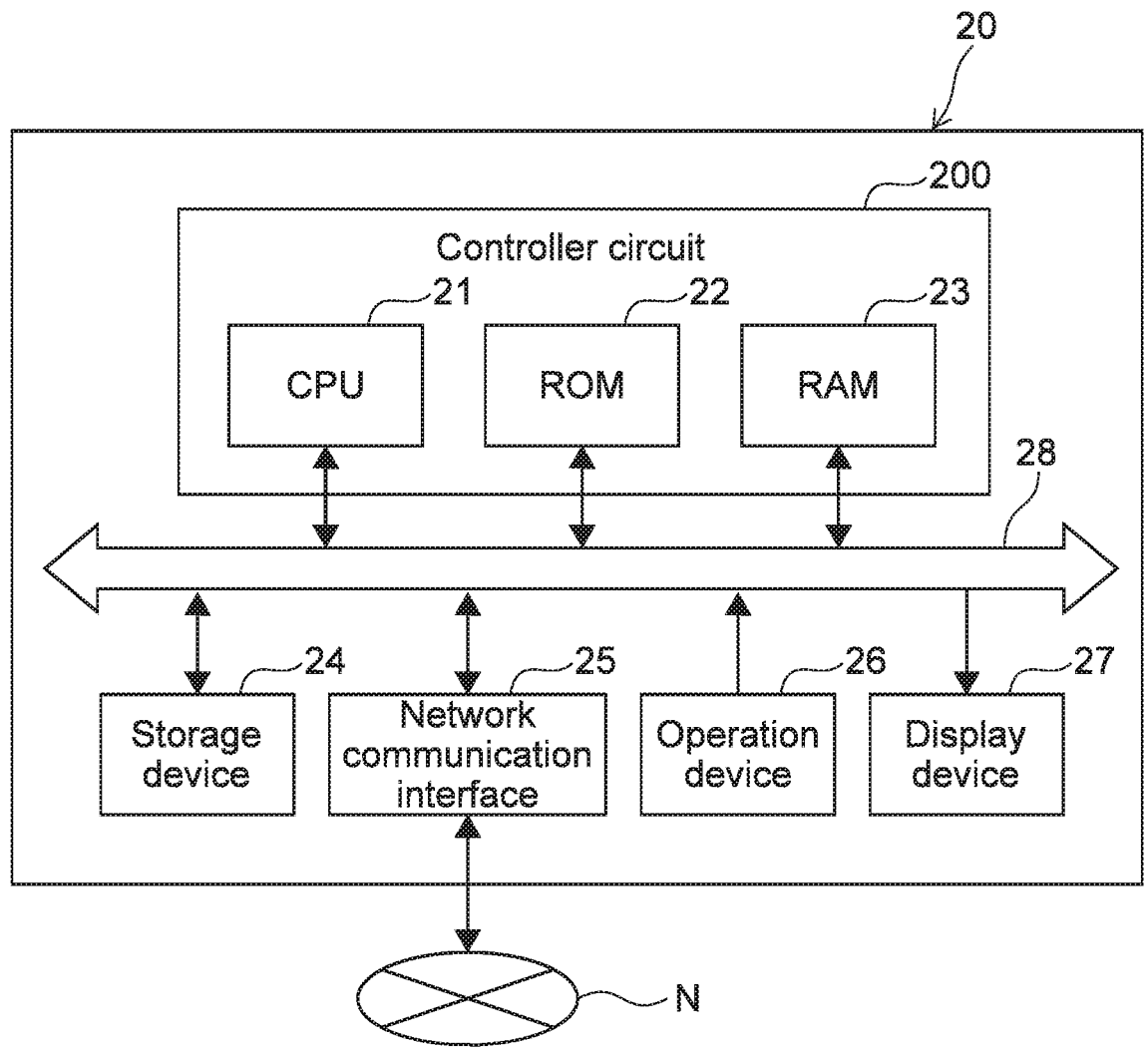
FIG. 3 shows a hardware configuration of a server apparatus.

FIG. 3 shows a hardware configuration of a server apparatus.

The server apparatus 20 includes the CPU 21, the ROM 22, the RAM 23, the storage device 24, which is a large-volume nonvolatile memory such as an HDD or an SSD, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

4. Hardware Configuration of Mobile Device

Figure 4:
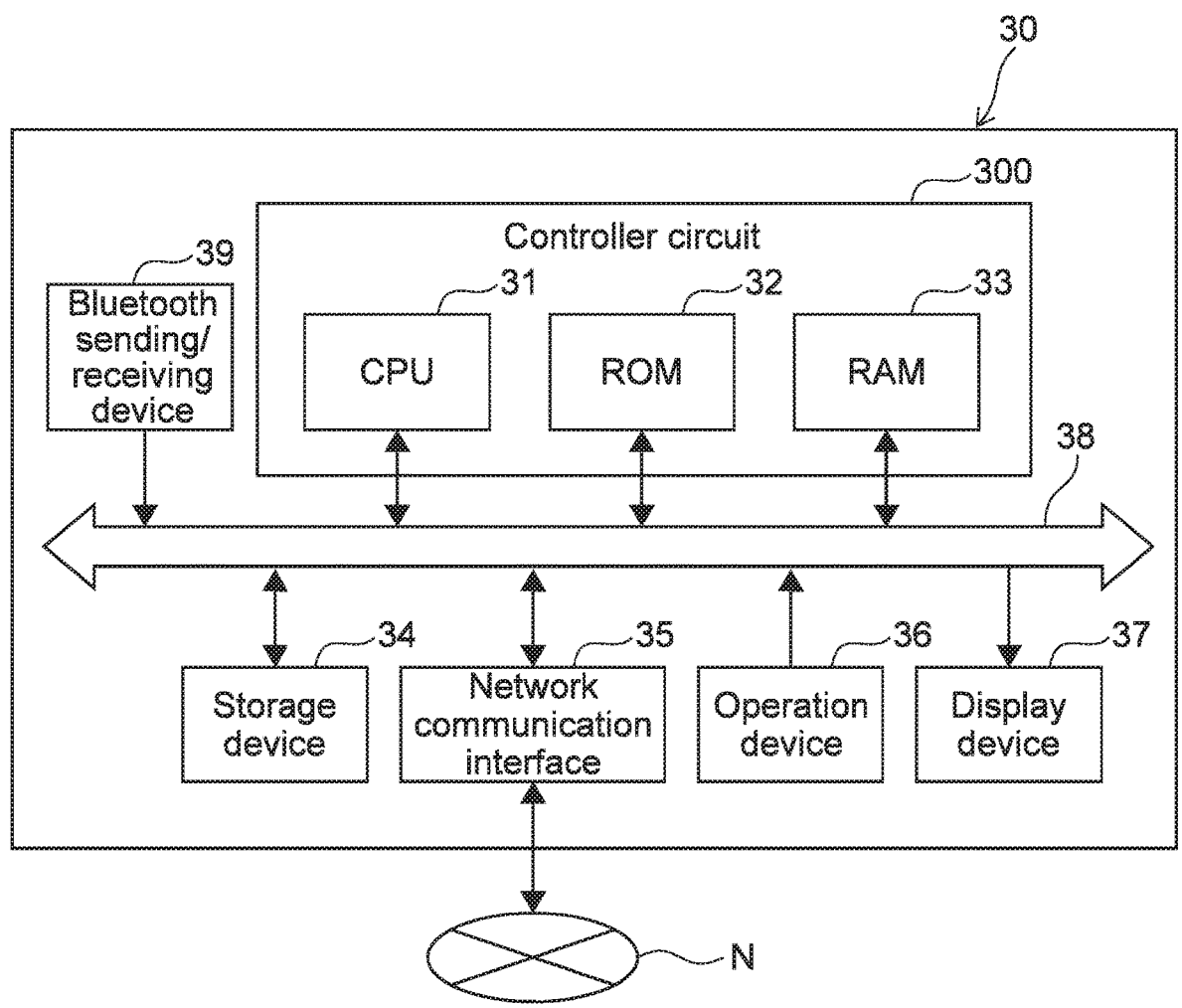
FIG. 4 shows a hardware configuration of a mobile device.

FIG. 4 shows a hardware configuration of a mobile device.

The mobile device 30 includes the CPU 31, the ROM 32, the RAM 33, the storage device 34, which is a large-volume nonvolatile memory such as an HDD or an SSD, the network communication interface 35, the operation device 36, the display device 37, and the Bluetooth (registered trademark) sending/receiving device 39, and the bus 38 connecting them to each other. The operation device 36 is one mode of an input device. A sound input device including a microphone may be provided as an input device.

The controller circuit 300 includes the CPU 31, the ROM 32, and the RAM 33. The CPU 31 loads information processing programs stored in the ROM 32 in the RAM 33 and executes the information processing programs. The ROM 32 stores programs executed by the CPU 31, data, and the like nonvolatile. The ROM 32 is an example of a non-transitory computer readable recording medium.

The Bluetooth (registered trademark) sending/receiving device 39 sends and receives signals allowed in the Bluetooth (registered trademark) standard.

5. Functional Configuration of Information Processing System

Figure 5:
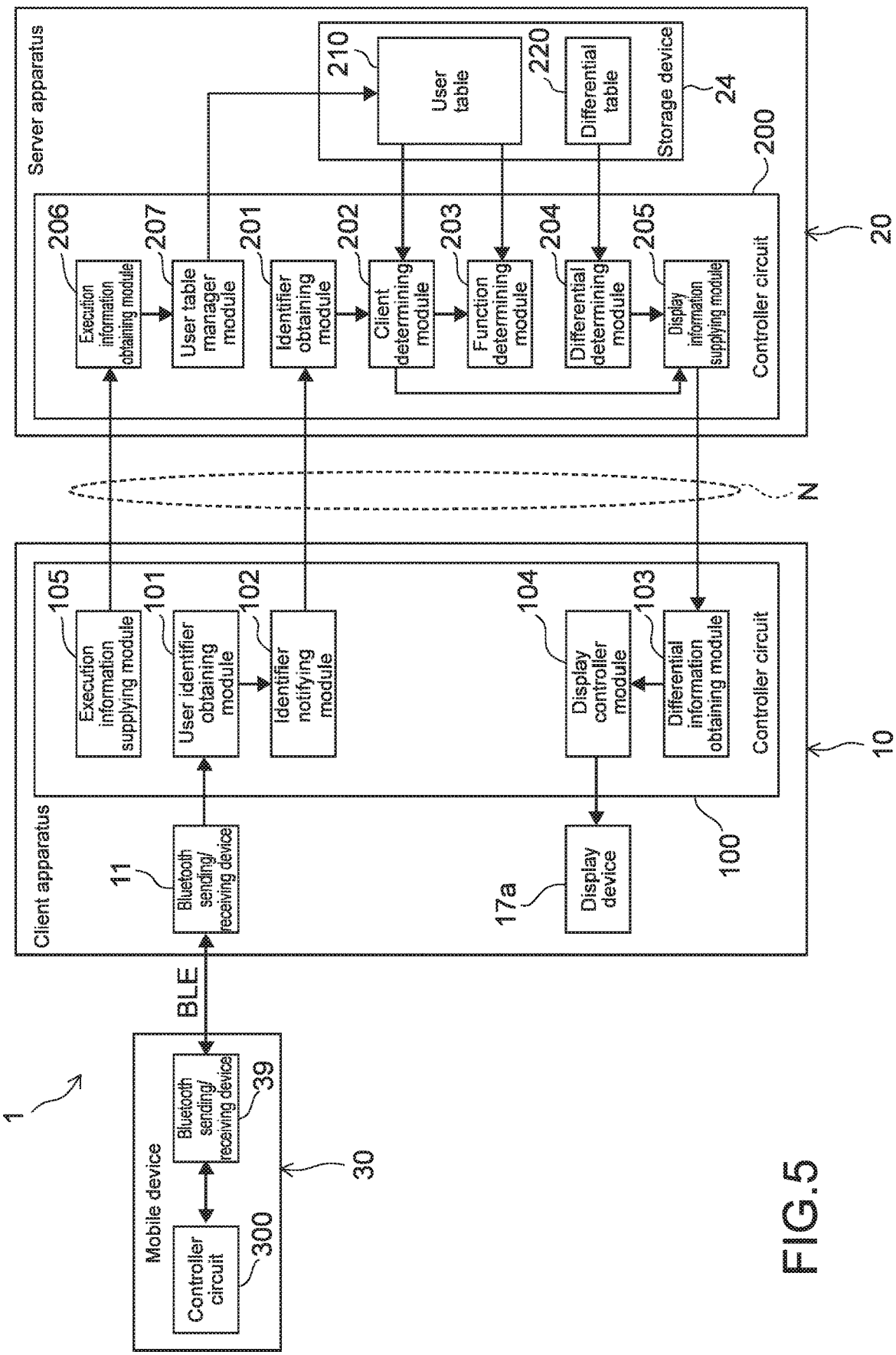
FIG. 5 shows a functional configuration of the information processing system.

FIG. 5 shows a functional configuration of the information processing system.

In the controller circuit 100 of the client apparatus 10, the CPU 11*a* loads an information processing program stored in the ROM 11*c* in the RAM 11*b* and executes the information processing program to operate as the user identifier obtaining module 101, the identifier notifying module 102, the differential information obtaining module 103, the display controller module 104, and the execution information supplying module 105.

In the controller circuit 200 of the server apparatus 20, the CPU 21 loads an information processing program stored in the ROM 22 in the RAM 23 and executes the information processing program to operate as the identifier obtaining module 201, the client determining module 202, the function determining module 203, the differential determining module 204, the display information supplying module 205, the execution information obtaining module 206, and the user table manager module 207.

6. Structure of User Table

Figure 6:
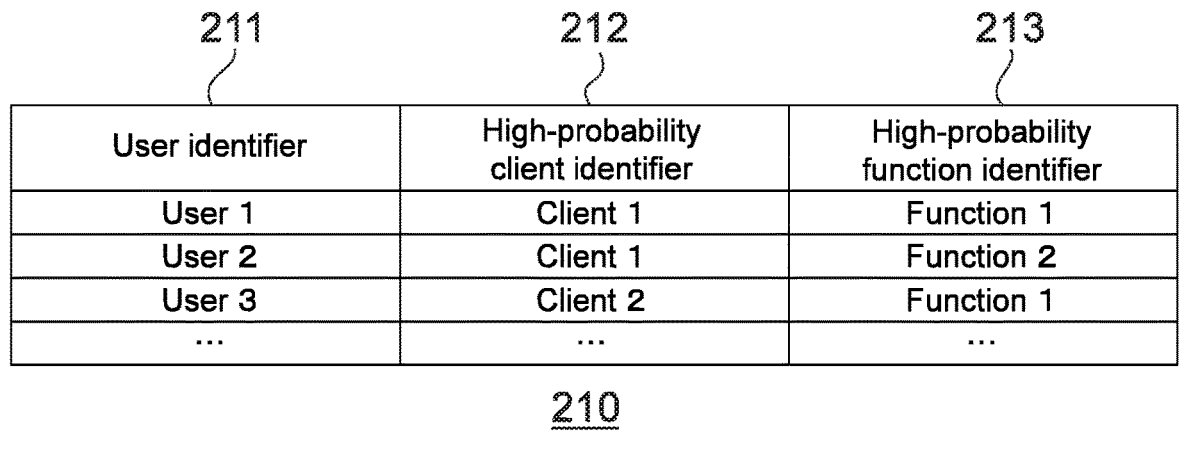
FIG. 6 shows an example of a structure of a user table.

FIG. 6 shows an example of a structure of a user table.

The storage device 24 of the server apparatus 20 stores the user table 210. The user table 210 registers the user identifier 211, the high-probability client identifier 212, and the high-probability function identifier 213 in association with each other.

The user identifier 211 identifies a user who logs in to the mobile device 30.

The high-probability client identifier 212 identifies a high-probability client apparatus 10, the high-probability client apparatus 10 being the client apparatus 10 whose probability of being used by the user, who logs in to the mobile device 30, is high. The high-probability client apparatus 10 may be, for example, the client apparatus 10 which has the largest number of times of use (in other words, highest use frequency) by the user, who is identified by the user identifier 211, in a recent certain time period (for example, within several months). This is merely an example. The high-probability client apparatus 10 may be determined on the basis of a parameter different from the number of times of use (use frequency).

The high-probability function identifier 213 identifies a high-probability function, the high-probability function being a function (copy function, facsimile function, etc.) whose probability of being used by the user, who logs in to the mobile device 30, in the high-probability client apparatus 10 is high. The high-probability function may be, for example, a function which has a largest number of times of use (in other words, highest use frequency) by the user, who is identified by the user identifier 211, in a recent certain time period (for example, within several months) in the high-probability client apparatus 10. This is merely an example. The high-probability function may be determined on the basis of a parameter different from the number of times of use (use frequency).

7. Structure of Differential Table

Figure 7:
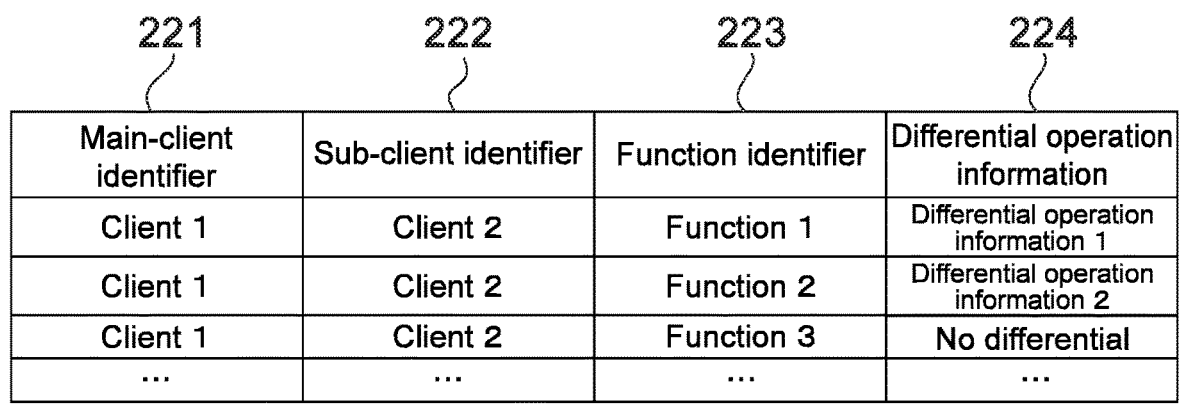
FIG. 7 shows an example of a structure of a differential table.

FIG. 7 shows an example of a structure of a differential table.

The storage device 24 of the server apparatus 20 stores the differential table 220. The differential table 220 registers the main-client identifier 221, the sub-client identifier 222, the function identifier 223, and the differential operation information 224 in association with each other.

The main-client identifier 221 identifies a main-client apparatus which is one of the plurality of client apparatuses 10.

The sub-client identifier 222 identifies a sub-client apparatus which is another one of the plurality of client apparatuses 10.

In the present embodiment, "main" and "sub" do not mean a hierarchical relation such as master and slave, but are for convenience in writing. All the plurality of client apparatuses 10 are registered as main-client apparatuses in the differential table 220. All the other client apparatuses 10 are registered as sub-client apparatuses against one main-client apparatus in the differential table 220. According to a specific example, the client identifier of the first client apparatus 10 is registered as the main-client identifier 221, and the client identifier of the second client apparatus 10 is registered as the sub-client identifier 222. At the same time, the client identifier of the second client apparatus 10 is registered as the main-client identifier 221, and the client identifier of the first client apparatus 10 is registered as the sub-client identifier 222. Such double-registering is performed because of properties of the differential operation information 224.

The function identifier 223 identifies a function which is executable by the main-client apparatus and the sub-client apparatus. Where a main-client apparatus and a sub-client apparatus have a plurality of executable functions, one function identifier 223 is registered for each function. In other words, the plurality of different function identifiers 223 are registered for one main-client apparatus and one sub-client apparatus.

The differential operation information 224 is information indicating an operation different from an operation to be input in the operation device 17 of the sub-client apparatus by a user when the sub-client apparatus executes the function (function identified by the function identifier 223), out of an operation to be input in the operation device 17 of the main-client apparatus by a user when the main-client apparatus executes the function (function identified by the function identifier 223). According to a specific example, the first differential operation information 224 is registered in association with a combination of the client identifier of the first client apparatus 10 being the main-client identifier 221 and the client identifier of the second client apparatus 10 being the sub-client identifier 222. Specifically, the first differential operation information 224 indicates a different part of the operation of the second client apparatus being the main-client apparatus 10, which is different from the operation of the second client apparatus 10 being the sub-client apparatus. Meanwhile, the second differential operation information 224, which is different from the first differential operation information 224, is registered in association with a combination of the client identifier of the second client apparatus 10 being the main-client identifier 221 and the client identifier of the first client apparatus 10 being the sub-client identifier 222. Specifically, the second differential operation information 224 indicates a different part of the operation of the second client apparatus being the main-client apparatus 10, which is different from the operation of the first client apparatus 10 being the sub-client apparatus. That is why such double-registering is performed as described above.

8. Operational Flow of Information Processing System

As the presupposition of the operation, the Bluetooth (registered trademark) sending/receiving device 11 of the client apparatus 10 outputs BLE signals periodically (for example, every several seconds).

The Bluetooth (registered trademark) sending/receiving device 39 of the mobile device 30 receives a BLE signal from the client apparatus 10 located in a signal receivable area. When the mobile device 30 receives a BLE signal having a certain intensity or more from any one client apparatus 10, then the mobile device 30 sends the user identifier, which identifies the user who logs in to the mobile device 30, to the client apparatus 10 via the network N or via wireless near field communication (FIG. 5 shows wireless near field communication, for example). The "certain intensity" means an intensity of a BLE signal that the mobile device 30 receives from the client apparatus 10 where the mobile device 30 is located within a certain distance (typically, 1 meter or more and several meters or less. Relatively small distance, but not right in front) from the client apparatus 10. The "certain intensity" is a relatively high intensity.

Figure 8:
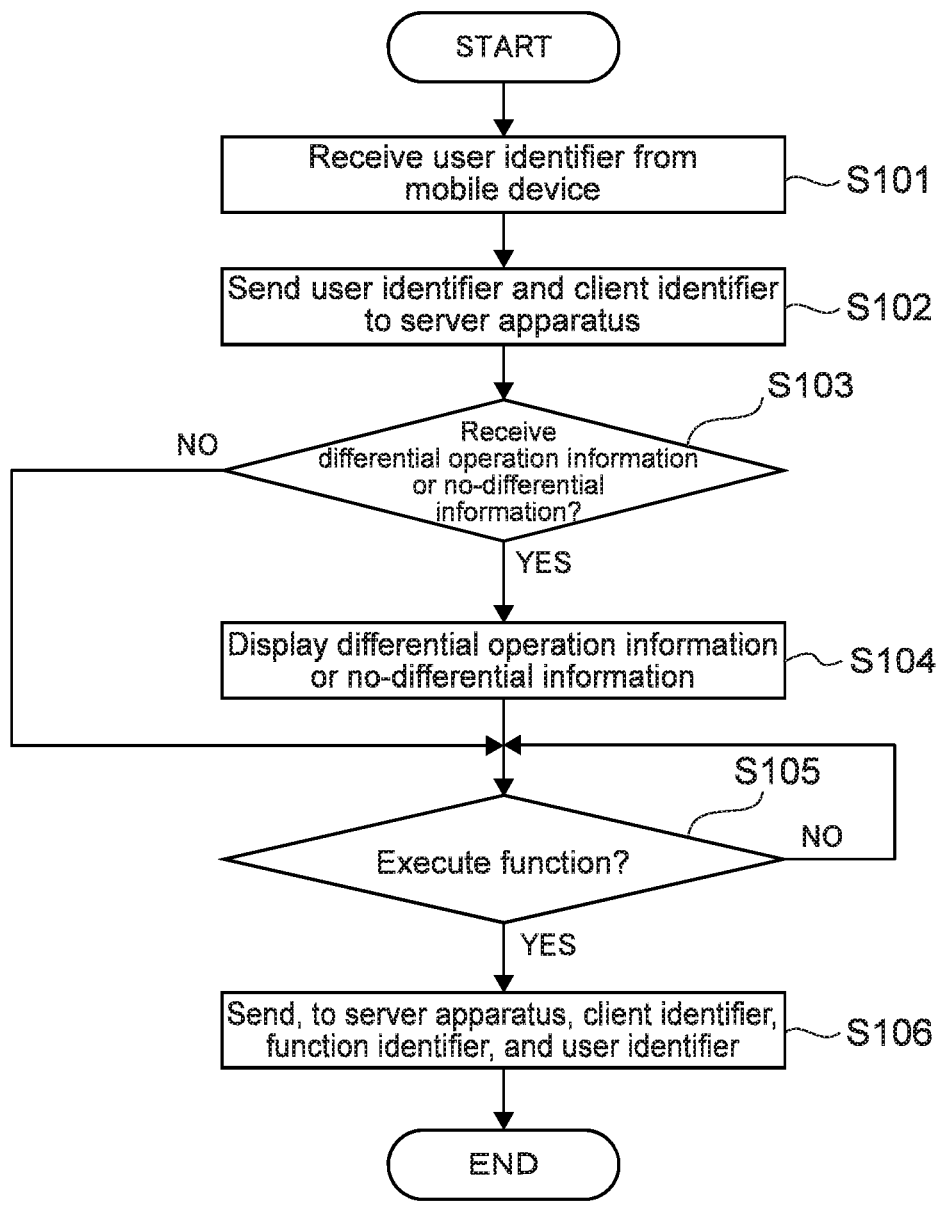
FIG. 8 shows an operational flow of the client apparatus.

FIG. 8 shows an operational flow of the client apparatus.

The user identifier obtaining module 101 of the client apparatus 10 receives the user identifier identifying the user who logs in to the mobile device 30 from the mobile device 30 via the Bluetooth (registered trademark) sending/receiving device 11 (or the network communication interface 13) (Step S101).

The identifier notifying module 102 of the client apparatus 10 sends the user identifier identifying the user who logs in to the mobile device 30 and the client identifier identifying the client apparatus 10 to the server apparatus 20 via the network N (Step S102).

Figure 9:
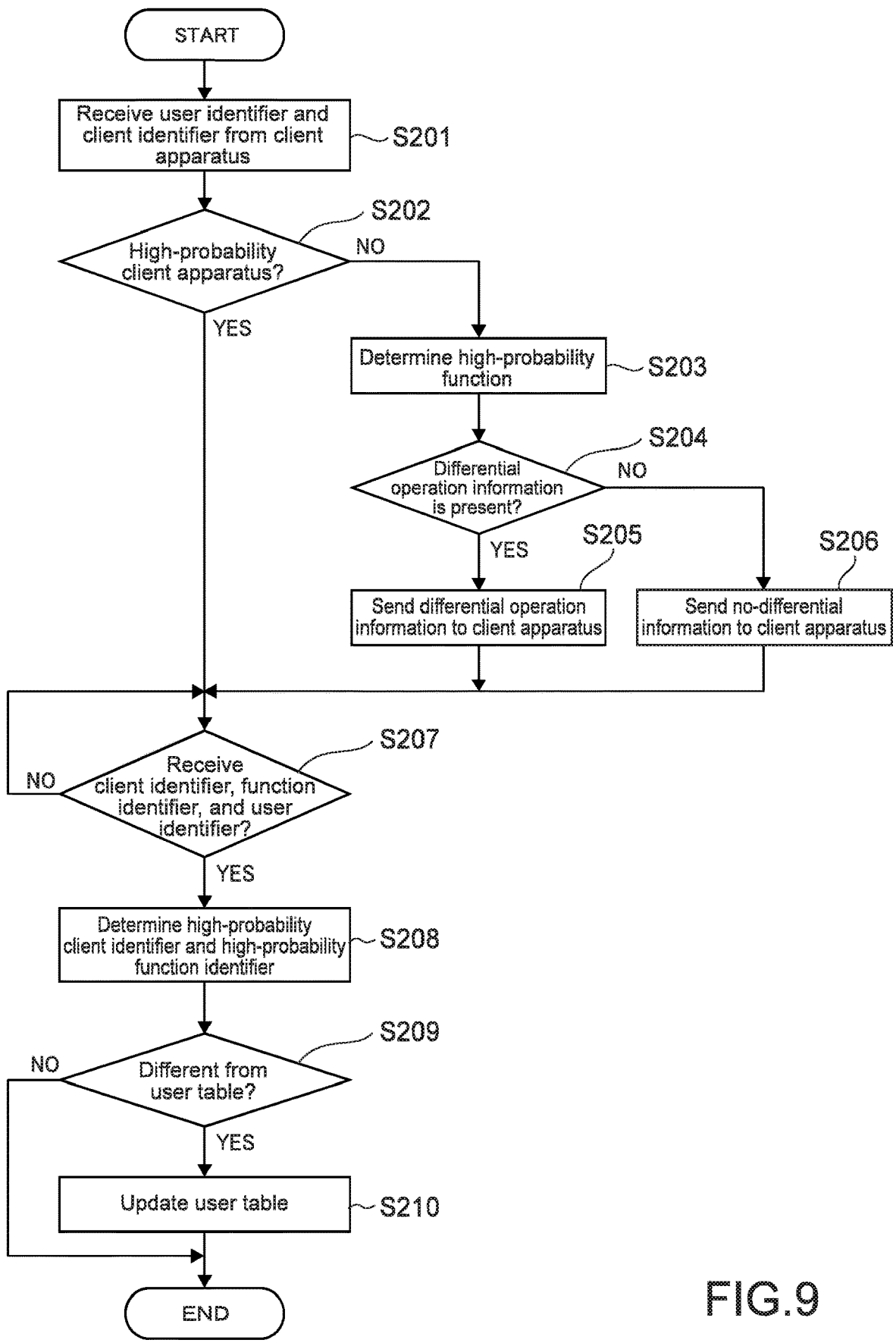
FIG. 9 shows an operational flow of the server apparatus.

FIG. 9 shows an operational flow of the server apparatus.

The identifier obtaining module 201 of the server apparatus 20 receives the user identifier identifying the user who logs in to the mobile device 30 and the client identifier identifying the client apparatus 10 from the client apparatus 10 via the network N (Step S201).

The client determining module 202 of the server apparatus 20 determines whether or not the client apparatus 10, which is identified by the received client identifier, is the high-probability client apparatus 10 (the high-probability client apparatus 10 is a client apparatus whose probability of being used by a user identified by the received user identifier is high). Specifically, the client determining module 202 determines, with reference to the user table 210, whether or not the high-probability client identifier 212 in association with the received user identifier 211 is (i.e., matches) the received client identifier (Step S202).

The client determining module 202 of the server apparatus 20 determines that the client apparatus 10, which is identified by the received client identifier, is not the high-probability client apparatus 10. Specifically, the client determining module 202 determines, with reference to the user table 210, that the high-probability client identifier 212 in association with the received user identifier 211 is not (i.e., does not match) the received client identifier (Step S202, NO). It means that the user is relatively close to the client apparatus 10 whose probability of being used by the user himself is not high (not highest use frequency).

In this case (Step S202, NO), the function determining module 203 of the server apparatus 20 determines a high-probability function, the high-probability function being a function whose probability of being used by the user, who is identified by the received user identifier, in the high-probability client apparatus 10 is high. Specifically, the function determining module 203 determines, with reference to the user table 210, the high-probability client identifier 212 and the high-probability function identifier 213 in association with the received user identifier 211 (Step S203).

The differential determining module 204 of the server apparatus 20 determines whether or not differential operation information is present. The "differential operation information" is information indicating an operation different from an operation to be input in the operation device 17 of the high-probability client apparatus 10 by a user when the high-probability client apparatus 10 executes the high-probability function, out of an operation to be input in the operation device 17 of the client apparatus 10 by a user when the one client apparatus 10, which is identified by the received client identifier, executes the high-probability function. For example, where the "high-probability function" is a copy function, the "differential operation information" is information indicating an operation different from an operation to be input in the operation device 17 by a user when the client apparatus 10 executes the copy function, out of an operation to be input in the operation device 17 by a user when the one client apparatus 10 executes the copy function. Specifically, the differential determining module 204 determines, with reference to the differential table 220, whether or not differential operation information 224 is present, the differential operation information 224 being in association with the received client identifier being the main-client identifier 221, the high-probability client identifier (the high-probability client identifier 212 determined in Step S203) being the sub-client identifier 222, and the high-probability function identifier (the high-probability function identifier 213 determined in Step S203) (Step S204).

The "differential operation information" may include, for example, a manual (user guide for operation method) of an operation to be input in the operation device 17 of the client apparatus 10 when the client apparatus 10 executes the high-probability function, and information indicating the different operation, which is different from the operation to be input in the operation device 17 of the high-probability client apparatus 10, out of the operation included in the manual. The "information indicating the different operation" may be, for example, a highlight on a text indicating the different operation in the manual of the client apparatus 10.

The differential determining module 204 of the server apparatus 20 determines that the differential operation information is present (Step S204, YES). In this case, the display information supplying module 205 of the server apparatus 20 sends the differential operation information to the client apparatus 10 via the network N (Step S205).

Meanwhile, the differential determining module 204 of the server apparatus 20 determines that the differential operation information is not present (Step S204, NO). In this case, the display information supplying module 205 of the server apparatus 20 sends no-differential information to the client apparatus 10 via the network N, the no-differential information being information indicating that the differential operation information is not present (Step S206). The "no-differential information" may be, for example, a text message such as "you can use copy function with usual operation".

The differential information obtaining module 103 of the client apparatus 10 receives the differential operation information (Step S205) or the no-differential information (Step S206) from the server apparatus 20 via the network N (Step S103, YES).

The display controller module 104 of the client apparatus 10 displays the differential operation information (in this example, manual with highlight) or the no-differential information (in this example, text message) received from the server apparatus 20 on the display device 17a (Step S104).

By the way, where the server apparatus 20 determines that the client apparatus 10 identified by the received client identifier is the high-probability client apparatus 10 (Step S202, YES), the server apparatus 20 does not send the differential operation information or the no-differential information. So the high-probability client apparatus 10 does not receive the differential operation information or the no-differential information from the server apparatus 20 (Step S103, NO), and does not display the differential operation information or the no-differential information. The reason is as follows. The high-probability client apparatus 10 is the client apparatus 10 having the highest use frequency for the user. So the user is used to using the high-probability client apparatus 10, and it is not necessary to display such information.

Where the differential operation information (in this example, manual with highlight) or the no-differential information (in this example, text message) is displayed, the user operates the operation device 17 of the client apparatus 10 with reference to such information. As a result, the client apparatus 10 executes any function (which may be high-probability function or may be another function) (Step S105, YES).

The execution information supplying module 105 of the client apparatus 10, after a function is executed, sends, to the server apparatus 20 via the network N, the client identifier identifying the client apparatus 10, a function identifier identifying the executed function, and a user identifier identifying a user who has logged in when the client apparatus 10 executed the executed function (Step S106).

The execution information obtaining module 206 of the server apparatus 20 receives, from the client apparatus 10 via the network N, the client identifier, the function identifier, and the user identifier (Step S207, YES).

The user table manager module 207 of the server apparatus 20 determines, on a basis of the client identifier and the function identifier received from the client apparatus 10, the high-probability client identifier 212 and the high-probability function identifier 213 to be registered in the user table 210 in association with the received user identifier 211 (Step S208).

For example, the server apparatus 20 may determine as follows. The storage device 24 of the server apparatus 20 stores combinations of client identifiers and function identifiers used in a recent certain time period for each user identifier received from the client apparatus 10. The execution information obtaining module 206 stores, in the storage device 24, the combination of the client identifier and the function identifier received this time in association with the user identifier received this time. Where the new combination of the client identifier and the function identifier is stored in the storage device 24, then the user table manager module 207 may determine, as the high-probability client identifier 212 to be registered in the user table 210, the client identifier, whose number of registration in association with the user identifier is the largest. Further, the user table manager module 207 may determine, as the high-probability function identifier 213 to be registered in the user table 210, whose number of registration in association with the user identifier is the largest.

Where the determined high-probability client identifier 212 and/or the determined high-probability function identifier 213 are/is different from the high-probability client identifier 212 and/or the high-probability function identifier 213 currently registered in the user table 210 (Step S209, YES), the user table manager module 207 of the server apparatus 20 updates the user table 210 with the determined value(s) (Step S210).

9. Conclusion (1) According to the present embodiment, where there is a probability of using a client apparatus 10 other than the high-probability client apparatus 10 by a user (Step S202, NO), the server apparatus 20 sends, to the client apparatus 10, differential operation information (Step S204, YES) from the high-probability function (Step S203), the high-probability function being a function whose probability of being used by the user in the high-probability client apparatus 10 is high (Step S205). As a result, when the user operates the client apparatus 10, whose use frequency for the user is low, the user is capable of operating the client apparatus 10 with reference to the displayed differential operation information.

(2) According to the present embodiment, the server apparatus 20 sends, to the client apparatus 10, the differential operation information based on the client apparatus 10 (the high-probability client apparatus 10), which the user is used to using and operation method of which may be well known by the user. As a result, when the user operates the client apparatus 10 whose use frequency is low for the user, the user is capable of operating the client apparatus 10 with reference to the differential operation information based on the client apparatus 10 (the high-probability client apparatus 10), which the user himself is used to using and operation method of which may be well known by the user.

(3) According to the present embodiment, the server apparatus 20 sends, to the client apparatus 10, the differential operation information based on the function (high-probability function), which the user is used to using and operation method of which may be well known by the user in the high-probability client apparatus 10. As a result, when the user operates the client apparatus 10 whose use frequency is low for the user, the user is capable of operating the client apparatus 10 with reference to the differential operation information based on the function (the high-probability function), which the user himself is used to using and operation method of which may be well known by the user in the high-probability client apparatus 10.

(4) According to the present embodiment, the differential operation information includes a manual of an operation to be input in the operation device of the client apparatus 10 when the client apparatus 10 executes the high-probability function, and information indicating the different operation out of the operation included in the manual. For example, the differential operation information may be a manual of the client apparatus 10 (different from the high-probability client apparatus 10), and a highlight on a text indicating the different operation. As a result, the user may understand the different operation more easily.

(5) According to the present embodiment, where the differential operation information is not present (Step S204, NO), the server apparatus 20 sends no-differential information to the client apparatus 10, the no-differential information being information indicating that the differential operation information is not present (Step S206). As a result, the user is capable of explicitly understanding that the differential operation information is not present.

(6) According to the present embodiment, the distance between the mobile device 30 that the user carries and the client apparatus 10 is, for example, 1 meter or more and several meters or less. As a result, the client apparatus 10 is capable of displaying (Step S104) the differential operation information (Step S205) or the no-differential information (Step S206) around time just before the user arrives the client apparatus 10 on foot. It means that the client apparatus 10 displays the differential operation information or the no-differential information before the timing at which the user should start the operation for the client apparatus 10. As a result, the user is capable of starting the operation for the client apparatus 10 with reference to such information.

(7) According to the present embodiment, after a function is executed by the client apparatus 10, the server apparatus 20 receives, from the client apparatus 10, the client identifier, the function identifier identifying the executed function, and the user identifier, determines, on a basis of the received client identifier and the received function identifier, the high-probability client identifier 212 and the high-probability function identifier 213 to be registered in the user table 210 in association with the received user identifier 211, and updates the user table 210. As a result, every time the client apparatus 10 executes a function the server apparatus 20 updates the user table 210. So the server apparatus 20 is always capable of selecting the newest and most appropriate high-probability client apparatus 10 and high-probability function for the user.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
    a plurality of client apparatuses, each of the plurality of client apparatuses including an operation device;
    a mobile device communicatively connected to at least one of the plurality of client apparatuses; and
    a server apparatus communicatively connected to the plurality of client apparatuses,
    the one client apparatus being configured to
        receive, from the mobile device within a certain distance from the client apparatus, a user identifier identifying a user who logs in to the mobile device, and
        send, to the server apparatus, the received user identifier and a client identifier identifying the client apparatus,
    the server apparatus being configured to
        receive, from the one client apparatus, the user identifier and the client identifier,
        determine whether or not the one client apparatus is a high-probability client apparatus, the high-probability client apparatus being a client apparatus whose probability of being used by a user identified by the received user identifier is high,
        if it is determined that the one client apparatus is not the high-probability client apparatus,
        determine a high-probability function, the high-probability function being a function whose probability of being used by the user in the high-probability client apparatus is high,
        determine whether or not differential operation information is present, the differential operation information being information indicating an operation different from an operation to be input in an operation device of the high-probability client apparatus when the high-probability client apparatus executes the high-probability function, out of an operation to be input in an operation device of the one client apparatus when the one client apparatus executes the high-probability function, and
        if it is determined that the differential operation information is present, send the differential operation information to the one client apparatus,
    the one client apparatus being configured to
        receive, from the server apparatus, the differential operation information, and
        present the received differential operation information.

2. The information processing system according to claim 1, wherein
    the server apparatus is configured to determine, as the high-probability client apparatus, a client apparatus which has a largest number of times of use by the user in a recent certain time period.

3. The information processing system according to claim 1, wherein
    the server apparatus is configured to determine, as the high-probability function, a function which has a largest number of times of use by the user in a recent certain time period in the high-probability client apparatus.

4. The information processing system according to claim 1, wherein
    the differential operation information includes
        a manual of an operation to be input in the operation device of the one client apparatus when the one client apparatus executes the high-probability function, and
        information indicating the different operation out of the operation included in the manual.

5. The information processing system according to claim 1, wherein
    the server apparatus is configured to
        if it is determined that the differential operation information is not present, send no-differential information to the one client apparatus, the no-differential information being information indicating that the differential operation information is not present, and
    the one client apparatus is configured to
        if the one client apparatus receives the no-differential information from the server apparatus,
        present information indicating that the differential operation information is not present.

6. The information processing system according to claim 1, wherein
    the certain distance is 1 meter or more and several meters or less.

7. The information processing system according to claim 1, wherein
the server apparatus includes a storage device,
the storage device is configured to store
a user table configured to register a user identifier, a high-probability client identifier, and a high-probability function identifier in association with each other,
the user identifier identifying a user who logs in to the mobile device,
the high-probability client identifier identifying a high-probability client apparatus, the high-probability client apparatus being a client apparatus whose probability of being used by the user is high,
the high-probability function identifier identifying a high-probability function, the high-probability function being a function whose probability of being used by the user in the high-probability client apparatus is high, and
a differential table configured to register a main-client identifier, a sub-client identifier, a function identifier, and differential operation information in association with each other,
the main-client identifier identifying a main-client apparatus which is one of the plurality of client apparatuses,
the sub-client identifier identifying a sub-client apparatus which is another one of the plurality of client apparatuses,
the function identifier identifying a function which is executable by the main-client apparatus and the sub-client apparatus,
the differential operation information being information indicating an operation different from an operation to be input in an operation device of the sub-client apparatus by a user when the sub-client apparatus executes the function, out of an operation to be input in an operation device of the main-client apparatus by a user when the main-client apparatus executes the function, and
the server apparatus is configured to
receive, from the one client apparatus, the user identifier and the client identifier,
determine, with reference to the user table, whether or not the high-probability client identifier in association with the received user identifier is the received client identifier,
if it is determined that the high-probability client identifier in association with the received user identifier is not the received client identifier,
determine, with reference to the user table, the high-probability client identifier and the high-probability function identifier in association with the received user identifier,
determine, with reference to the differential table, whether or not differential operation information is present, the differential operation information being in association with the received client identifier being the main-client identifier, the determined high-probability client identifier being the sub-client identifier, and the determined high-probability function identifier, and
if it is determined that the differential operation information is present, send the differential operation information to the one client apparatus.

8. The information processing system according to claim 7, wherein
client apparatus is configured to
after a function is executed, send, to the server apparatus, a client identifier identifying the client apparatus, a function identifier identifying the executed function, and a user identifier identifying a user who has logged in when the client apparatus executed the executed function, and
server apparatus is configured to
receive, from the client apparatus, the client identifier, the function identifier, and the user identifier,
determine, on a basis of the received client identifier and the received function identifier, the high-probability client identifier and the high-probability function identifier to be registered in the user table in association with the received user identifier, and
update the user table.

9. A server apparatus communicatively connected to a plurality of client apparatuses, the plurality of client apparatuses being communicatively connected to a mobile device, each of the plurality of client apparatuses including an operation device,
the server apparatus being configured to
receive, from the one client apparatus, a user identifier and a client identifier, the user identifier identifying a user who logs in to the mobile device and being received from the mobile device within a certain distance from the client apparatus, the client identifier identifying the client apparatus,
determine whether or not the one client apparatus is a high-probability client apparatus, the high-probability client apparatus being a client apparatus whose probability of being used by a user identified by the received user identifier is high,
if it is determined that the one client apparatus is not the high-probability client apparatus,
determine a high-probability function, the high-probability function being a function whose probability of being used by the user in the high-probability client apparatus is high,
determine whether or not differential operation information is present, the differential operation information being information indicating an operation different from an operation to be input in an operation device of the high-probability client apparatus when the high-probability client apparatus executes the high-probability function, out of an operation to be input in an operation device of the one client apparatus when the one client apparatus executes the high-probability function, and
if it is determined that the differential operation information is present, send the differential operation information to the one client apparatus.

10. A non-transitory computer readable recording medium that records an information processing program executable by a controller circuit of a server apparatus communicatively connected to a plurality of client apparatuses, the plurality of client apparatuses being communicatively connected to a mobile device, each of the plurality of client apparatuses including an operation device,
the information processing program causing the controller circuit of the server apparatus to
receive, from the one client apparatus, a user identifier and a client identifier, the user identifier identifying a user who logs in to the mobile device and being received from the mobile device within a certain distance from the client apparatus, the client identifier identifying the client apparatus, determine whether or not the one client apparatus is a high-probability client apparatus, the high-probability client apparatus being a client apparatus whose probability of being used by a user identified by the received user identifier is high, if it is determined that the one client apparatus is not the high-probability client apparatus, determine a high-probability function, the high-probability function being a function whose probability of being used by the user in the high-probability client apparatus is high, determine whether or not differential operation information is present, the differential operation information being information indicating an operation different from an operation to be input in an operation device of the high-probability client apparatus when the high-probability client apparatus executes the high-probability function, out of an operation to be input in an operation device of the one client apparatus when the one client apparatus executes the high-probability function, and if it is determined that the differential operation information is present, send the differential operation information to the one client apparatus.

* * * * *